United States Patent
Dierkes

(10) Patent No.: US 10,899,090 B2
(45) Date of Patent: Jan. 26, 2021

(54) METHOD FOR PRODUCING FIBER COMPOSITE COMPONENTS BY MEANS OF A VACUUM INJECTION METHOD

(71) Applicant: Faserverbund Innovations UG (haftungsbeschränkt), Ibbenbüren (DE)

(72) Inventor: Dominik Dierkes, Ibbenbüren (DE)

(73) Assignee: Faserverbund Innovations UG (haftungsbeschränkt), Ibbenbüren (DE)

( * ) Notice: Subject to any disclaimer, the term of this patent is extended or adjusted under 35 U.S.C. 154(b) by 220 days.

(21) Appl. No.: 16/016,926

(22) Filed: Jun. 25, 2018

(65) Prior Publication Data
US 2018/0370160 A1  Dec. 27, 2018

(30) Foreign Application Priority Data

Jun. 26, 2017 (DE) .......... 10 2017 114 140
Dec. 15, 2017 (DE) .......... 10 2017 130 201
Dec. 27, 2017 (EP) .......... 17210651

(51) Int. Cl.
*B29C 70/44* (2006.01)
*B29C 70/54* (2006.01)

(52) U.S. Cl.
CPC .......... *B29C 70/443* (2013.01); *B29C 70/547* (2013.01); *B29C 70/548* (2013.01); *B29C 2791/006* (2013.01)

(58) Field of Classification Search
None
See application file for complete search history.

(56) References Cited

U.S. PATENT DOCUMENTS

| | | |
|---|---|---|
| 2003/0011094 A1 | 1/2003 | Filsinger et al. |
| 2009/0273111 A1 | 11/2009 | Bansal |
| 2010/0285297 A1* | 11/2010 | Bansal ............. B29C 70/443 428/306.6 |
| 2013/0327220 A1 | 12/2013 | De Mulatier |
| 2017/0341320 A1* | 11/2017 | McKibbin ......... B29C 70/443 |

FOREIGN PATENT DOCUMENTS

| | | |
|---|---|---|
| DE | 19813104 | 9/1999 |
| DE | 20 2010 001 836 | 7/2011 |

* cited by examiner

*Primary Examiner* — Michael P. Rodriguez
(74) *Attorney, Agent, or Firm* — Gudrun E. Huckett

(57) ABSTRACT

In a method for producing a fiber composite component by vacuum injection, a fiber composite semifinished product is arranged in a component chamber of a tool. A vacuum chamber is arranged adjacent to the component chamber. The vacuum chamber is separated from the component chamber by a separation material. Component chamber and vacuum chamber are sealed relative to the tool environment by a gas-tight and matrix-material tight cover material. Vacuum is applied to the vacuum chamber and a matrix material is introduced into the component chamber. The matrix material is cured and the finished fiber composite component is removed from the component chamber. The separation material separating the vacuum chamber from the component chamber has a pore size between 0.4 μm and 30 μm and provides a matrix material-slowing action but is not matrix material-tight.

5 Claims, 1 Drawing Sheet

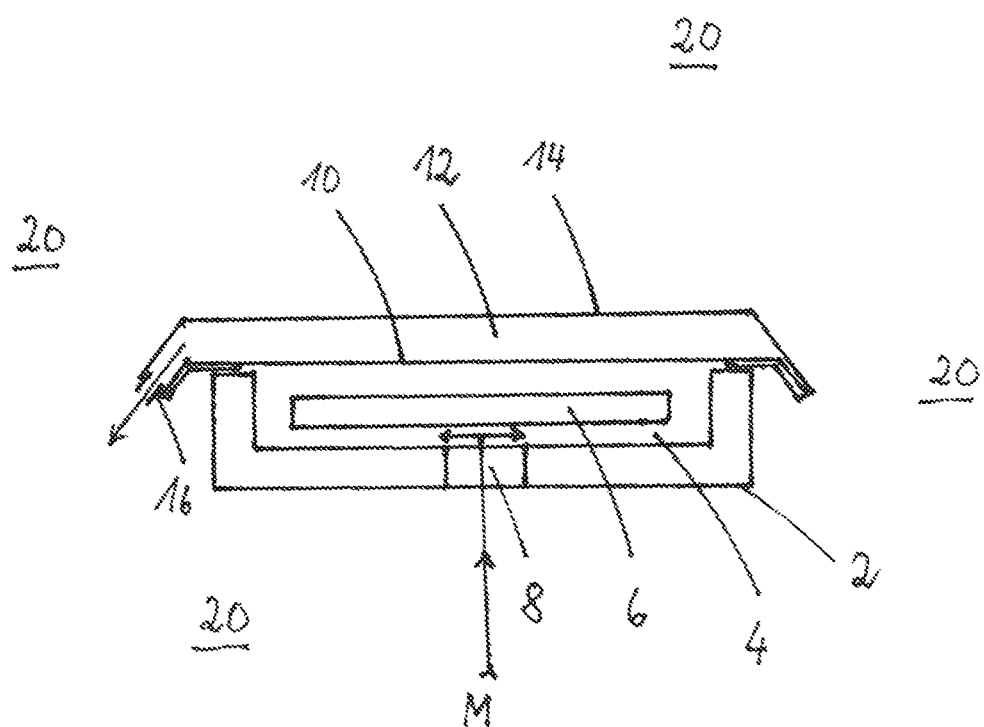

METHOD FOR PRODUCING FIBER COMPOSITE COMPONENTS BY MEANS OF A VACUUM INJECTION METHOD

BACKGROUND OF THE INVENTION

The invention relates to a method for producing fiber composite components by means of a vacuum injection method, comprising the steps:

arranging a fiber composite semifinished product in a component chamber of a tool, arranging and positioning a vacuum chamber for evacuating gas from the component chamber adjacent to the component chamber by means of a separation membrane separating the vacuum chamber from the component chamber, sealing the component chamber and the vacuum chamber relative to the tool environment by means of a gas-tight and matrix material-tight cover material, applying a vacuum to the vacuum chamber, introducing a matrix material into the component chamber, and curing and removing the finished fiber composite component.

A corresponding manufacturing process is disclosed in US 2003/0011904 A1. The vacuum chamber is formed in accordance with the disclosed process method in that relative to the component chamber a gas-permeable but matrix material-impermeable membrane is arranged about the semifinished product. A gas-tight and matrix material-tight cover film is then placed onto this membrane. After gas-tightly sealing off the component chamber and the vacuum chamber relative to the environment surrounding the tool, vacuum is applied to the vacuum chamber and to the component chamber. Subsequently, a matrix material is infiltrated at least at one location of the thus formed infusion structure in that, at least at one other location of the structure, vacuum is generated in the gas-tightly sealed interior of the structure. In this way, the component chamber is filled with the matrix material and the fiber material positioned therein is wetted with the matrix material. Between the membrane and the cover film, spacer elements can be provided so that the chamber as such is maintained and air can be removed by suction through the vacuum chamber. Because the membrane covers the component chamber and additionally at least a part of the entire tool in a flat arrangement, a very great quantity of the expensive membrane material is required.

A different method is disclosed in DE 20 2010 001 836 U1. The configuration of a gas-tight component chamber closed outwardly is realized substantially in analogy to the afore described configuration. The vacuum action is however applied here by a vacuum line which is enveloped by a gas-permeable but matrix material-impermeable membrane and is suitably placed about the component chamber in order to be able to remove air by suction in the surroundings of the vacuum line. Since the vacuum line is not flat but is placed as a conduit about the component chamber, the quantity of membrane film in this type of configuration for forming a vacuum chamber is significantly smaller.

Both of the afore described methods are comparatively expensive in regard to manufacturing fiber composite components because the employed membrane material is very expensive. In order to configure the membrane material such that it is gas-permeable but impermeable to the matrix material, extremely small holes must be introduced into the membrane material which is correspondingly complex and causes high costs.

It is the object of the invention to design a method for producing a fiber composite component to be more efficient.

SUMMARY OF THE INVENTION

The object is solved according to the invention for a method of the aforementioned kind in that the component chamber is sealed relative to the vacuum chamber by a separation material that has a pore size in a range between 0.4 µm and 30 µm and provides a greatly matrix material slowing action but is not matrix material-tight.

The vacuum chamber can be designed to be areal and flat as disclosed in US 2003/0011094 A1 or it can be designed in a hose shape as disclosed in DE 20 2010 001 836 U1. It is also possible to combine both methods of configuring a vacuum chamber with each other in order to utilize the advantages of both systems depending on the component to be produced so that a part of the component chamber is covered areally with a separation material and another part of the component chamber is evacuated by means of a vacuum line in hose shape.

The separation material can be a membrane of a flat, areal monolithic diffusion-open plastic material that comprises appropriate pores. The flat, areal plastic material can be produced in an extruder or can be cast and subsequently provided with the pores. A compacted nonwoven is also conceivable as a membrane. In addition to the plastic material or the nonwoven which can be produced and employed with great reliability, also other types of materials are conceivable as separation material, for example, also paper filters with a corresponding pore size and permeability. In case of paper filters, the properties can be adjusted beneficially by appropriate finishing, for example, impregnation or coating. The separation material is designed such that it enables breakthrough/passage of matrix material as soon as it has reached the separation material. The matrix material is thus not stopped by the separation material at any point in time but is only slowed down.

The matrix material-permeable separation material makes it possible to suck matrix material out of the component chamber. It is also possible that the matrix material can flow back from the vacuum chamber into the component chamber. In this way, the fiber volume content can be affected in a targeted fashion. In this way, it is in particular possible to influence in a targeted fashion the fiber volume content in the lamination (composite) and also the composite component thickness. The use of the separation material according to the invention provides technical advantages in this way.

It is also possible, for example, in case of larger components to be produced, to arrange separation material that is provided with different pore sizes across the surface area in a distribution so as to affect the penetration of the matrix material into the vacuum chamber in a desired fashion. For example, it may be expedient to employ smaller pore sizes at locations which are farther removed from the vacuum pump in comparison to regions of the tool structure that are closer to the vacuum pump in order to slow the penetration of the matrix material into the vacuum chamber in the farther removed regions.

When a separation material with a pore size between 0.4 µm and 30 µm is employed, the manufacture of a corresponding separation membrane is significantly more cost efficient. Such a separation membrane can be made, for example, of polypropylene and produced simply by stretching or by chemical etching. Chemical etching, for example, is possible in that the original film material contains calcium carbonate that subsequently is etched out with an acid from the polyolefin composite. At the discontinuities where calcium carbonate is located the pores are then formed and have a pore size in accordance with the invention. A prior radioactive radiation, as it is required, for example, in the track-etch method for matrix material-tight membranes for producing fine pore sizes, or other complex processing methods are not required in case of membranes with larger pore sizes.

A separation membrane with a pore size of more than 0.4 µm has no longer a resin-blocking action for conventional matrix material systems used for vacuum infusion because such matrix material systems can pass through pores with a pore size of greater than 0.4 µm. According to the teaching of the invention, completely matrix material-tight membranes must not be used for separating the vacuum chamber from the component chamber. This holds true independent of whether the component chamber is covered with the separation material in a flat areal arrangement or whether a hose as a vacuum chamber is employed which is separated by the separation material from the component chamber. The separation material must slow down the matrix material along its path to the vacuum chamber for such a length of time until the component chamber is completely flooded with the matrix material and the fiber material contained in the component chamber is completely impregnated with the matrix material. During this time, only so little of the matrix material may reach the interior of the vacuum chamber that it is still possible to remove by suction gas from the not yet completely infused component chamber through the separation material into the vacuum chamber in order to enable in this way a complete infusion of the component chamber. For this purpose, a separation membrane that slows the matrix material is required but not a matrix material-tight membrane.

The slowing time to be exerted by the separation material on the employed matrix material system in order to be able to completely fill the component chamber is also significant affected by the size and shape of the fiber composite component to be produced. Depending on the fiber composite component, 5 minutes or 30 minutes of processing time may be required in order to fill the component chamber completely with the matrix material. In case of the same matrix material system, a separation material with a larger pore size can be employed for fiber composite components with a shorter processing time while it is recommended to employ a separation material with a smaller pore size for components with a longer processing time.

According to an embodiment of the invention, the pore size is matched to the cross-linking rate of the employed matrix material system. The cross-linking rate depends on the reactivity of the employed matrix material system. The more reactive the employed matrix material system, the faster the molecules that are present in the matrix material system will crosslink upon mixing of the matrix material system to form longer molecule chains which have an immediate effect on the viscosity of the matrix material and on the pore size-dependent slowing effect of the separation membrane. For an identical infusion time, a separation material with a greater pore size must be employed for a matrix material system with a higher cross-linking rate in comparison to a matrix material system with a lower cross-linking rate in order to fill the component chamber completely with the matrix material. Since the cross-linking rate also has an effect on the flow behavior and the distribution rate of the matrix material within the component chamber, in case of a cross-linking rate that is too high and a pore size that is too small, there is the risk that the component chamber is not completely filled when the advance of the resin front in the component chamber stops. In case of a cross-linking rate that is too low and a pore size that is too large, there is the risk that the vacuum chamber will fill too quickly with matrix material so that is it then no longer possible to remove by suction through the vacuum chamber gas from those areas of the component chamber which have not yet been completely filled with matrix material. As an alternative to the change of the pore size, the process parameters such as temperature, flow promoting agents or pre-gelling time can be adjusted in order to cover with one pore size as many matrix material systems as possible.

According to an embodiment of the invention, the pore size is matched to the viscosity of the employed matrix material system. The viscosity indicates the degree of cross-linking of the employed matrix material system. Crosslinking of the molecules in the matrix material system begins upon mixing of the components of the matrix material system and continues faster or slower, depending on the reactivity of the employed matrix material system. In any case, the viscosity thus increases during the processing duration of the employed matrix material system. However, depending on the employed matrix material system, the viscosity can exhibit significant differences from the start. For example, epoxide resin systems can have a lower viscosity in comparison to polyester resins. However, even within such system classes, significant differences in their viscosity may result by a targeted selection of chemical components and their constitution. The viscosity of a matrix material system that is to be employed in the method according to the invention can be derived from tables that are made available to the user by the manufacturers of the matrix material systems. In a processing time of 15 minutes, the viscosity of a first matrix material can increase, for example, from 200 mPa s to 350 mPa s and the viscosity of a second matrix material from 100 mPA s to 10,000 mPa s. Conventional matrix material systems employed for the vacuum infusion method have, after completion of the mixing process and at the beginning of flooding of the component chamber, a viscosity between 150 mPa s and 300 mPa s.

In order to determine whether the pore size is selected to be sufficiently small in order to prevent a breakthrough of the material matrix into the vacuum chamber which would interfere with complete filling of the component chamber, the sum of the time required for mixing of the matrix material system and the filling duration of the component chamber must be taken into consideration as a relevant duration.

The respective temperature during processing has a significant effect on the viscosity of the respective matrix material system. While at a hole size of the pores of 0.4 µm to 1 µm in the separation material at a temperature of the matrix material system of 30° C., breakthrough of the matrix material through the membrane is observed at 20 minutes, at a temperature of 45° C. of the same matrix material a breakthrough already occurs at 10 minutes. It is thus important to evaluate the usability of a separation material with a predetermined pore size with regard to the processing temperature of the employed matrix material system. Conversely, a matrix material system that at a higher processing temperature is unsuitable for use with a separation material of a predetermined pore size can be made suitable in that it is processed at a lower processing temperature.

According to an embodiment of the invention, the pore size is matched to the viscosity of the employed matrix material system. In vacuum infusion methods of the prior art, a resin infusion-driving pressure difference between the component chamber and/or the vacuum chamber as a first pressure zone and the exterior space surrounding the tool configuration of the infusion structure as a second pressure zone, that is e.g. under atmospheric pressure or an artificially generated excess pressure, can amount to e.g. an atmospheric pressure corresponding to approximately maximally 1,000 mbar for vacuum-assisted infusions without use of a pressure chamber. Depending on the output of the employed vacuum pump and the respective infusion structure, it is however not always possible to utilize completely this theoretical potential. At lower differential pressures, the processing time required in order to fill the component chamber completely with matrix material is prolonged. For longer processing times due to a lower differential pressure it is therefore by trend advantageous to employ a separation material with a smaller pore size while for higher differential pressures also a separation material with larger pore sizes may be employed. The differential pressure in systems in which the matrix material is supplied under pressure can surpass atmospheric pressure. Under such pressure conditions, special conditions apply for the employable pore sizes.

For determining for all afore described methods whether a specified pore size of the range of 0.4 µm to 30 µm is suitable for application of a specified matrix material system in a certain tool configuration for producing a fiber composite component, Darcy's law can be utilized which is expressed by the following equation:

$$\frac{q}{A} = v_f = -k_f \times i$$

q=flow rate m³/s
A=cross-sectional surface area=pores+membrane surface
$v_f$=filter rate
i=hydraulic gradient
$k_f$=permeability coefficient $$\lambda_f = K \times \frac{\rho_f}{\eta_f} \times g$$

The permeability coefficient can also be experimentally determined.
The permeability is derived as follows:

$$K = \frac{Q \times \eta \times \chi}{A \times \Delta p}$$

K=permeability
Q=volume flow
η=viscosity
χ=flow length
Δp=differential pressure

By using the equations shown above, for a specified matrix material a suitable pore size can be determined in order to obtain an indicative value for the slowing time of the separation material.

According to an embodiment of the invention, after blocking the inflow of the matrix material into the tool while the vacuum is maintained in the vacuum chamber, a pressure compensation in the tool chamber is realized by migration of the matrix material through the separation material. Depending on how much matrix material has passed through the separation material into the interior of the vacuum chamber, different pressure conditions are realized in the component chamber. At the beginning of infusion, the dry fibers had been compacted by the vacuum in the component chamber. The matrix material is introduced by means of ambient pressure into the component chamber. Without a targeted counter pressure, the fibers stand up completely and the pressure conditions equilibrate. In this case, an oversaturation of the fibers takes place which leads to a fiber volume content that is too low. Farther removed from the point of introduction, the fibers cannot stand up completely because, by friction of the matrix material in the structure, a counter pressure is produced that prevents complete erection of the fibers. In this way, a lamination (composite) with inhomogeneous fiber volume contents and wall thicknesses is produced.

Since the inflow of further matrix material into the component chamber from the reservoir has already been blocked, the pressure compensation between the different pressure zones within the component chamber can be realized only by material movements of the matrix material. In this context, a special feature of the separation material according to the invention resides in that it permits a return flow of matrix material from the vacuum chamber into the component chamber. Thus, matrix material that at one location of the separation material has flowed into the vacuum chamber from the component chamber, can flow back into the component chamber at this location or at a different location. The vacuum chamber functions in this way as a type of distribution chamber for distributing the matrix material within the tool.

After blocking of the matrix material supply, the lamination however can level only to a certain extent because friction is great in the structure across the distance. The separation material which is slowing down the matrix material provides a defined resistance relative to the matrix material. Therefore, at full vacuum so much matrix material can flow out of the component chamber into the vacuum chamber that a homogenous lamination is produced in the component chamber. Depending on the viscosity of the matrix material system, respectively, on the resistance of the separation material, it may happen that the fiber volume content at full vacuum is then too high in the component. This can be controlled by lowering the vacuum in the vacuum chamber after completion of infusion. Due to the reduced differential pressure, less matrix material will flow into the vacuum chamber through the separation material.

When the desired matrix material quantity is contained in the vacuum chamber, this quantity provides a resistance to additional matrix material which wants to flow through the separation material into the vacuum chamber and the matrix material flow through the separation material that provides the slowing effect is stopped. The fiber volume content of the lamination located in the component chamber undergoes equilibration due to the pressure differentials between the different regions and due to the thus triggered movements of the matrix material within the tool structure after infusion. An advantage is the short path of the matrix material through the separation material that constitutes a type of braking (decelerating) film with a defined resistance.

The fiber volume content can thus be adjusted by the differential pressure after infusion. Depending on the matrix material system, it can be required or it may be helpful to employ in the vacuum chamber a distribution medium in order to be able to absorb excess matrix material.

Due to the pressure compensation it is also possible to draw gas bubbles from the matrix material which otherwise would no longer be accessible by the vacuum. Due to the further movement of the matrix material along the separation material which is gas-permeable and matrix material-permeable and movement through the separation material, induced by the pressure compensation, more gas bubbles come into contact with the separation material. Here, the gas bubbles can dissolve in that the gas is released from the matrix material and can escape into the vacuum of the vacuum chamber from here. Components which have been produced with the separation material according to the invention have a significantly lower reject rate based on gas inclusions in the matrix material.

The quality of the composite component produced with the separation material according to the invention is also higher because it is possible, due to the material movements of the matrix material induced by the pressure compensation, to equilibrate the fiber volume content in the component chamber. For a high component quality it is desirable, on the one hand, to embed all fibers of the components in the matrix material and, on the other hand, it is also beneficial to not have, beyond the desired embedding of the fiber material, unnecessary additional material build-up comprised only of the matrix material which does not improve the static load capacity of the component and only represents additional excess weight of the component. By the erection forces of the fibers and the suction action of the matrix material from the component chamber into the vacuum chamber, excess matrix material can be removed from the component chamber, namely especially at precisely the location where the full counter pressure of the erected fibers is not counteracting the atmospheric pressure. This is precisely at the location where the matrix material has built up a material thickness that is too large. The atmospheric pressure forces the excess matrix material out of the component chamber through the separation material into the vacuum chamber from where it can be discharged into a collecting container. With the separation material according to the invention, it is possible to precisely control how great the fiber volume content of the component produced in the component chamber actually is by means of the filling and distribution duration of the matrix material in the component chamber by controlling the vacuum in regard to its magnitude and duration.

With the separation material according to the invention, it is also possible to convey in a targeted fashion a greater volume of the matrix material through the component chamber than required in order to produce the finished fiber composite component in the component chamber. The excess of matrix material which is sucked by means of the vacuum chamber through the separation material serves the purpose of achieving in the component chamber a uniform distribution of the matrix material while providing a fiber volume content as high as possible with a minimal proportion of gas bubbles in the matrix material of the finished fiber composite component. Since the separation material according to the invention is designed such that it significantly slows the passage of matrix material by means of the specified pore size but does not completely block its passage, the pressure differences are produced that enable the desired distribution of the matrix material in the component chamber and the removal of excess quantities of the matrix material.

BRIEF DESCRIPTION OF THE DRAWING

The attached illustration shows schematically a suitable configuration for use with the method of the invention.

DESCRIPTION OF PREFERRED EMBODIMENTS

In order to explain the method of the invention, a purely schematic illustration of an embodiment of a tool 2 for use with the invention is provided. The tool 2 comprised a component chamber 4. A fiber composite semifinished product 6 is positioned in the component chamber 4. Through inlet 8 a matrix material M can be introduced into the component chamber 4, as indicated by the arrow. The separation material 10 according to the invention is placed sealingly on top of the component chamber 4. The separation material 10 provides a boundary relative to the vacuum chamber 12, i.e., separates the component chamber 4 from the vacuum chamber 12. The vacuum chamber 12 and the component chamber 4 are sealed by a gas-tight and matrix material-tight cover material 14 relative to the tool environment 20 and to the exterior. The cover material 14 is connected at least at the edges to the separation material (separation membrane) 10 such that no gas from the exterior, from the tool environment 20 of the tool 2 and from the exterior of the cover material 14, can flow at these edges into the vacuum chamber 12 when a vacuum is applied to the vacuum chamber 12.

When vacuum is applied though vacuum line 16 to the vacuum chamber 12, matrix material M flows through the inlet 8 into the component chamber 4 and is distributed in the component chamber 4. Since the separation membrane 10, comprised of a flat monolithic diffusion-open plastic material or a compressed or compacted nonwoven, greatly slows down or decelerates the matrix material M, the matrix material M reaches only slowly the vacuum chamber 12. During this time, gas that is still contained in the component chamber 4 can be removed through the separation membrane 10 from the component chamber 4. The gas is evacuated through vacuum line 16 from the vacuum chamber 12.

After curing of the matrix material, the finished fiber composite component is removed from the tool 2.

The specification incorporates by reference the entire disclosure of German priority document 10 2017 114 140.5 having a filing date of Jun. 26, 2017 and of German priority document 10 2017 130 201.8 having a filing date of Dec. 15, 2017.

While specific embodiments of the invention have been shown and described in detail to illustrate the inventive principles, it will be understood that the invention may be embodied otherwise without departing from such principles.

What is claimed is:

1. A method for producing a fiber composite component by vacuum injection, the method comprising:
   arranging a fiber composite semifinished product in a component chamber of a tool;
   arranging a vacuum chamber adjacent to the component chamber and separating the vacuum chamber from the component chamber by a separation material comprising a pore size between 0.4 µm and 30 µm, the pore size configured to provide a matrix material-slowing action for a matrix material;
   sealing the component chamber and the vacuum chamber relative to a tool environment of the tool by a gas-tight and matrix-material tight cover material;

applying a vacuum to the vacuum chamber and evacuating gas from the component chamber through the separation material;

introducing the matrix material into the component chamber and filling the component chamber with the matrix material while allowing the matrix material to pass through the separation material into the vacuum chamber subject to the matrix material-slowing action;

the matrix material-slowing action slowing a flow of the matrix material through the separation material for such a length of time until the component chamber is completely filled and the fiber composite semifinished product is completely impregnated with the matrix material;

curing the matrix material and removing the finished fiber composite from the component chamber.

2. The method according to claim 1, wherein the pore size of the separation material is matched to a cross-linking rate of the matrix material.

3. The method according to claim 1, wherein the pore size of the separation material is matched to a viscosity of the matrix material.

4. The method according to claim 1, wherein the pore size of the separation material is matched to a differential pressure of the matrix material.

5. The method according to claim 1, further comprising blocking an inflow of the matrix material into the component chamber while maintaining a vacuum in the vacuum chamber and compensating pressure by migration of the matrix material from the component chamber through the separation material into the vacuum chamber.

* * * * *